United States Patent Office 3,268,512
Patented August 23, 1966

3,268,512
REACTION OF CYANOGEN AZIDE WITH BENZ-
ENOID COMPOUNDS AND SELECTED AZE-
PINES MADE THEREBY
Frank Dennis Marsh, New Castle County, Del., assignor
to E. I. du Pont de Nemours and Company, Wilming-
ton, Del., a corporation of Delaware
No Drawing. Filed July 17, 1964, Ser. No. 383,486
21 Claims. (Cl. 260—239)

This application is a continuation-in-part of my co-pending application Serial Number 215,800, filed August 9, 1962, and also a continuation-in-part of my copending application Serial Number 234,878, filed November 1, 1962, and now abandoned but refiled as application Serial Number 383,233 on July 16, 1964.

This invention relates to, and has as its principal objects provision of the novel reaction between cyanogen azide and benzenoid compounds and certain novel and useful cyclic organic nitrogen compounds, specifically novel cyano-substituted azepines, made thereby. Aromatic cyanamides are also synthesized at times by the process but these are, in general, old compounds.

Warning: Cyanogen azide, a chemical employed in the immediate invention, is explosive when free or nearly free of solvent and should be handled with great care. It can be used, however, with comparative safety in dilute or moderately concentrated solutions.

The new compounds of this invention are 1H-azepine-1-carbonitriles and dimers thereof represented by the formula

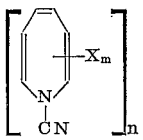

wherein X represents halogen, cyano, nitro, phenyl, alkyl, cycloalkyl, haloalkyl, alkoxy, alkoxycarbonyl, or 1,3-butadienylene substituents; $m$ is a cardinal number in the range 0–6; and $n$ is a cardinal number in the range 1–2. When X is 1,3-butadienylene, $m$ is 1 or 2 with respect to such divalent substituents, each of which is further defined as being attached at two vicinal carbon atoms to form a six-membered aromatic ring. The X's, when more than 1, may be different and the sum of valence bonds on the depicted ring filled by the named substituents and hydrogen is always six.

Preferred compounds of the foregoing class are those specified by the following values of X, together with respective values of $m$ shown in parentheses: no value (0); halogen (1); fluorine (6); methyl (1 or 2); tert-butyl (1); trichloromethyl (1); trifluoromethyl (1 or 2); methoxy (1); methoxycarbonyl (1); cyano (1); and nitro (1).

The new monomeric 1H-azepine-1-carbonitriles are the compounds of the above formula when $n$ is the number 1. They are also referred to as N-cyanoazepines. The monomeric N-cyanoazepines are most frequently colored materials (often liquids and usually red to yellow) which are normally stable in solution but which dimerize in bulk and sometimes in solution with varying degrees of ease at temperatures in the range of 25–150° C. They are converted quantitatively, when $m$ is less than 6, to corresponding N-phenylureas by acid hydrolysis.

The new compounds of the above formula when $n$ is the number 2 are dimeric N-cyanoazepines. These dimeric N-cyanoazepines are stable, generally colorless crystalline solids at ordinary temperatures.

The new method of preparing N-cyanoazepines, their dimers, and corresponding aromatic cyanamides is illustrated in the following overall reaction scheme:

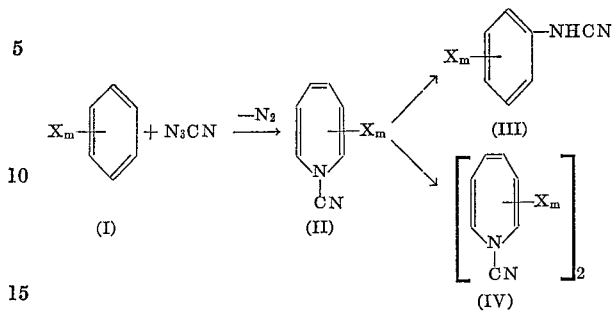

wherein X and $m$ have the values previously defined, Formula II represents the N-cyanoazepine products, Formula III represents the aromatic cyanamides, and Formula IV represents the N-cyanoazepine dimer. The method can be defined more specifically as the process for preparing at least one member of the group consisting of monomeric and dimeric N-cyanoazepines (II and IV) and aromatic cyanamides (III), which comprises reacting a benzenoid aromatic compound (I) that is free from nonaromatic carbon-to-carbon unsaturation with cyanogen azide at 35–150° C. until a substantial amount of nitrogen (at least 0.2 mole of $N_2$ per mole of cyanogen azide) has been evolved.

The reaction of cyanogen azide and aromatic compounds is believed to involve formation of an azepine structure in each instance, but the N-cyanoazepines (II) have widely different stabilities depending upon the nature of the substituents (X). Accordingly, a particular N-cyanoazepine may be so stable as to be obtained exclusively; it may be of intermediate stability and subject in part to molecular rearrangement to an aromatic cyanamide; or it may be so transitory that it is normally not isolable except in the rearranged form. However, when there is no proton on the aromatic ring, i.e., when $m$ is 6, the product is normally exclusively II, but it may rearrange to an N-substituted aryl cyanamide. When there is no X substituent, or when X is an electron-withdrawing group such as fluorine, trifluoromethyl, trichloromethyl, alkoxycarbonyl or cyano, the predominant isolated product is the N-cyanoazepine. When X is chlorine or an electron-donating group such as alkyl or alkoxy, the initial product formed is the N-cyanoazepine but it is normally isolated predominantly and sometimes exclusively as the aromatic cyanamide; and when the value of $m$ is 1 for such substituents, the aromatic cyanamide product is usually a mixture of the corresponding o- and p-substituted phenylcyanamides.

A relatively stable N-cyanoazepine (II) is obtained predominantly as the monomer, though generally not exclusively so, when the reaction time is limited to a half day or less, usually to about 1–8 hours, and the reaction temperature is maintained in the lower part of the operative range, e.g., below about 75° C. The N-cyanoazepine portion of the product can in many cases be obtained almost exclusively as the stable dimer, however, by prolonging the reaction time to periods of about two days (48 hours) or more, or by maintaining the reaction temperature in the upper part of the operative range, e.g., above about 75° C. When heated, some or all of an intermediately stable monomeric N-cyanoazepine may rearrange to a corresponding aromatic cyanamide.

A special case is represented by aromatic reactants having more than one aromatic ring, e.g., biphenyl or naphthalene. The reaction of cyanogen azide with biphenyl, or example, can take place at either or both benzene rings, the reaction being predominantly on only one ring when the mole ratio of cyanogen azide to biphenyl is no greater than 1:1. When the mole ratio of cyanogen azide to biphenyl is 2:1 or more, the product is predominantly a bis(N-cyanoazepine). Since such a monomeric product is bifunctional, intermolecular dimerization of both azepine units can lead to a stable polymer of high molecular weight. Likewise, reaction of cyanogen azide with a polycyclic fused-ring aromatic compound such as naphthalene or anthracene can lead to monomeric mono- or bis(N-cyanoazepine)-substituted products, and the latter can lead to stable polymers through subsequent intermolecular dimerization of azepine units.

The reaction of the aromatic compound with cyanogen azide is normally carried out for convenience at atmospheric pressure, but it can be accomplished just as well at sub- or super-atmospheric pressures. In most instances it is convenient to use a relatively large amount of the aromatic reactant, the stoichiometric excess acting as a solvent; or, if preferred, a solvent can be used which is substantially less reactive toward cyanogen azide than the aromatic reactant, together with a stoichiometric equivalent or excess of the latter. Although the reaction might be accomplished without a solvent or excess of the aromatic reactant, such practice is not recommended because of the risk of explosion which is inherent in the handling of undiluted or highly concentrated cyanogen azide. The reaction is carried out at temperatures in the range of about 35 to about 150° C., the preferred temperature range being about 40 to about 80° C.

The cyanogen azide reactant is ordinarily prepared by reaction of sodium azide and cyanogen chloride in a suitable solvent (cf., coassigned application U.S. Serial No. 279,022) which may be, and in the present instance preferably is, the aromatic reactant itself. For convenience, the in situ-prepared cyanogen azide may be allowed to react with the aromatic reactant without being isolated beforehand. However, if desired, the cyanogen azide can be prepared separately in a comparatively non-reactive medium and the aromatic reactant added later. Also, if desired, the cyanogen azide can be separated from other components, e.g., sodium chloride, of its preparational environment before it is reacted with the aromatic compound.

The N-cyanoazepine and aromatic cyanamide products are recovered by ordinary procedures, e.g., by filtration of the reaction mixture to remove insoluble materials and subsequent concentration and isolation of the soluble products by suitable evaporation, distillation or crystallization procedures.

The following examples further illustrate the preparation and properties of the new compounds of this invention.

*Example 1.—1H-azepine-1-carbonitrile monomer*

Part A.—Cyanogen azide was prepared by adding 80 ml. (96 g., 156 g. mole) of cyanogen chloride to a stirred slurry of 65 g. (1.0 g. mole) of sodium azide in 200 ml. (175 g., 2.24 g. mole) of dry benzene at a rate which maintained a reaction temperature of 5–12° C. while cooling the mixture in an ice bath. When the addition of cyanogen chloride was complete, the ice bath was removed and the mixture was stirred for 20 hours under a reflux condenser held at 0–5° C. (Note: If desired, excess cyanogen chloride can be removed at this point by evacuating the mixture to about 120 mm., but this step is unnecessary.) The mixture was filtered, the filtrate was diluted to a volume of 1 liter with benzene and the diluted solution was found by analysis to contain 0.86 g. mole of cyanogen azide.

Part B.—The benzene solution of cyanogen azide was stirred and heated at 46–53° C. for 6 hours, during which time 0.76 g. mole of gaseous nitrogen was liberated. A crystalline precipitate (22.68 g.) wich formed when the reaction mixture was cooled to room temperature was removed by filtration. (Note: The crystalline solid was identified as N-cyanoazepine dimer, which is more fully described in Example 2.) The dark colored filtrate was passed through a column 2″ in diameter by 1″ long containing magnesium fluosilicate ("Florisil") and emerged as a light red solution, half of which was concentrated by removal of benzene on a rotary evaporator at 25–30° C. and 0.5 mm. The concentrate (29.5 g.) was a mobile red oil. Distillation of 20 g. of this oil in a molecular still under $0.2\mu$ pressure at a pot temperature of 49–50° C. gave 14.7 g. of a bright red product, $n_D^{25.2}$ 1.5520, which was identified as monomeric 1H-azepine-1-carbonitrile.

Analysis for $C_7H_6N_2$.—Calc'd: C, 71.2; H, 5.12; N, 23.7; Mol. wt., 118. Found: C, 71.1; H, 5.25; N, 23.7; Mol wt., 119,[1] 118.[2]

The infrared spectrum of the distilled product in carbon tetrachloride showed absorption at $3.27\mu$ (characteristic of the grouping =CH), at $4.5\mu$ (C≡N group), and at 6.03 and $6.13\mu$ (—C=C— group). The UV absorption in 1,4-dioxane showed $\lambda_{max}$ at 334 m$\mu$ ($\varepsilon$=432). The proton n.m.r. spectrum in carbon tetrachloride (tetramethylsilane as internal reference) showed a complex group at $\tau$ 3.83–3.93 and a multilined pattern at $\tau$ 4.40–4.49 in an intensity ratio of 1:2, respectively. The infrared and n.m.r. spectra of the red oil from the rotary evaporator were identical with those of the distilled product.

Part C.—A solution of cyanogen azide (0.38 g. mole in 128 ml. of solution) was prepared from sodium azide and cyanogen chloride by the method illustrated in Part A, but with acetonitrile instead of benzene as the solvent. The solution was diluted with 400 ml. of acetonitrile, 500 ml. of benzene was added, and the mixture was then stirred and heated at 50–62° C. for 5 hours. Approximately 0.38 g. mole of nitrogen was liberated during the heating period. The reaction mixture was cooled to room temperature, 2.85 g. of precipitated solid was separated by filtration, and the filtrate was passed through a bed of "Florisil" 2″ in diameter by 4″ deep. The eluate was freed of solvent under 0.5 mm. pressure on a rotary evaporator at 25° C., and 34.4 g. of residual mobile red oil was obtained. Distillation of the oil in a molecular still yielded 16.5 g. of distillate and 14.5 g. of non-volatile crystalline residue. Both the original red oil and the distilled fraction showed identical infrared spectra matching that of the pure monomeric N-cyanoazepine described in Part B. The distillation residue and the solid removed by filtration from the original reaction mixture were the same material, identified as dimeric N-cyanoazepine.

When a small sample of distilled monomer was treated with aqueous silver nitrate, a slow exothermic rearrangement of N-cyanoazepine to phenylcyanamide occurred, and the cyanamide was precipitated in the form of its silver derivative. The silver derivative was identified by its infrared spectrum and by elemental analysis.

Analysis for $C_7H_5N_2Ag$—Calc'd: C, 37.4; H, 2.24; N, 12.45. Found: C, 37.5; H, 2.30; N, 12.6.

Distilled N-cyanoazepine (2.2 g.) reacted exotherically with 50 ml. of 18% aqueous hydrochloric acid, forming 2.5 g. (98.5% yield) of phenylurea. The phenylurea was isolated by evaporation of the acid solution, purified (M.P. 148–149° C.) by recrystallization from water, and identified by comparison with an authentic sample (infrared spectrum and mixed melting point).

*Example 2.—1H-azepine-1-carbonitrile dimer*

Part A.—A benzene solution (1 liter) containing 0.8 g. mole of cyanogen azide was prepared as in Part A of Example 1. The solution was stirred and heated at 40–48° C. for 53 hours, during which time approximately ---
[1] Cryoscopic method in benzene.
[2] Mass spectroscopic method.

0.8 g. mole of nitrogen was liberated. A precipitate which formed when the solution was cooled to room temperature was separated by filtration and the filtrate was evaporated to dryness. The crystalline residue from the evaporation and the solid separated by filtration were combined, giving 92 g. of total solid product. The crude product was dissolved in methylene chloride and the solution decolorized with carbon black. Addition of petroleum ether to the decolorized solution caused precipitation of white crystals (65.75 g., needles) which were separated by filtration and identified as dimeric 1H-azepine-1-carbonitrile by comparison with an analytical sample from another experiment.

*Part B.*—When monomeric N-cyanoazepine, prepared as in Part B of Example 1, was allowed to stand at room temperature for several hours, the red oil became partly crystalline. The crystalline material was separated and purified by recrystallization, and was identified as the dimeric N-cyanoazepine described more fully below. Alternatively, rapid exothermic dimerization occurred when monomeric N-cyanoazepine was heated to about 100° C.

Analytical data for N-cyanoazepine dimer were obtained on samples prepared by trituration of crude product with acetone followed by recrystallization from benzene containing a trace of petroleum ether. The dimer crystallized in the form of white needles, M.P. 216–218° C. Infrared analysis showed absorption at $3.29\mu$ (=CH), at $4.50\mu$ and $4.52\mu$ (CN), at $6.0\mu$ (C=C), and at 12.57 and $13.30\mu$ (individually characteristic). The proton n.m.r. spectrum in di(deuteromethyl) sulfoxide gave complex absorption patterns at $\tau$ 3.46 to 4.20, at $\tau$ 4.80 to 5.70, and at $\tau$ 6.35 to 6.83 in intensity ratios of 7:4:1, respectively.

Analysis for $C_{14}H_{12}N_4$—Calc'd: C, 71.2; H, 5.12; N, 23.7; Mol. Wt., 236. Found: C, 71.0; H, 5.18; N, 23.3; Mol. Wt., 235, 238.[1]

The UV spectrum in 1,4-dioxane of a sample purified further by chromatography (M.P. 220–221° C.) showed $\lambda_{max}$ 244m$\mu$ ($\epsilon$=6144).

Dimeric N-cyanoazepine can be purified conveniently by passing a methylene chloride solution through a shallow bed of "Florisil" (60–100 mesh) and afterward concentrating the effluent to a stage of crystallization, or diluting it with petroleum ether to induce crystallization of the dimer. The dimer is sparingly soluble in acetonitrile, methanol or methylene chloride and can be crystallized readily from these solvents. It is more highly soluble in dimethyl sulfoxide, dimethylformamide, or dichlorotetrafluoroacetone hydrate.

*Example 3.—Fluoro-1H-azepine-1-carbonitrile*

Cyanogen azide (0.19 g. mole) prepared in fluorobenzene was diluted with additional fluorobenzene to a total volume of 428 ml. and the resultant solution was heated at 58–63° C. for 4 hours, during which time approximately 0.2 g. mole of nitrogen was liberated. The reaction mixture yielded 1.4 g. of solid product, which separated on cooling the mixture to room temperature, and 410 ml. of red supernatant solution. Removal of solvent from 200 ml. of the red solution gave 12.2 g. of mobile red oil which was distilled in a molecular still at pressures in the range of 0.03 to $0.07\mu$ and a pot temperature of 25° C. The red liquid distillate (8.35 g.) was identified as a mixture of monomeric N-cyanofluoroazepines by elemental analysis and infrared, proton n.m.r. and fluorine n.m.r. spectra.

Analysis for $C_7H_5N_2F$—Calc'd: C, 61.8; H, 3.70; N, 20.7. Found: C, 62.1; H, 3.85; N, 20.7.

The spectral data are presented below. The residue from the distillation showed an infrared spectrum similar to that of dimeric N-cyanoazepine.

The monomeric distillate and the red oil from which it was obtained showed identical infrared absorption spectra with minor absorption at $3.11\mu$ (NH region, indicating a possible trace of fluorophenylcyanamide) and relatively strong absorption at $3.44\mu$ (CH), at $4.48\mu$ (CN), at 5.92, 6.0, 6.12, 6.23, and $6.60\mu$ (C=C), and at $8-8.85\mu$ (CF). The proton n.m.r. spectrum, taken at 50% concentration in carbon tetrachloride with tetramethylsilane as internal reference, showed a complex pattern between $\tau$ 3.53 and 4.58. The fluorine n.m.r. spectrum, determined at 56.4 mc. on 50% solution in carbon tetrachloride with 1,1,2,2-tetrachloro-1,2-difluoroethane ("Freon®-112") as external reference, showed a strong single peak at +1015 c.p.s. and two complex peaks in the vicinity of +1500 c.p.s. The intensity values of the respective peaks were in the ratio 1.3:1:1.

Hydrolysis of 4.2 g. of the monomeric distillate, dissolved in 15 ml. of carbon tetrachloride, with 18% aqueous hydrochloric acid at 72° C. for 5 hours gave 4.58 g. of crystalline product which was identified as a 1:1 mixture of o- and p-fluorophenylurea by elemental analysis and infrared, proton n.m.r. and fluorine n.m.r. spectra.

Analysis for $C_7H_7N_2OF$—Calc'd: C, 54.5; H, 4.58; N, 18.2. Found: C, 53.9; H, 4.53; N, 18.1.

*Example 4.—α,α,α-Trifluoromethyl-1H-azepine-1-carbonitrile*

A solution of 0.21 g. mole of cyanogen azide in 500 ml. of benzotrifluoride was heated at 51–58° C. for 5.5 hours, during which time approximately 0.2 g. mole of nitrogen was liberated. The reaction mixture was filtered at room temperature, and 200 ml. of the light red filtrate (480 ml.) was freed of solvent on a rotary evaporator at 25–40° C. and 0.5 mm. The residual mobile red oil (14.35 g.) was distilled in a molecular still at $0.02\mu$ pressure and a pot temperature of 30–40° C. to yield 10.1 g. of red liquid distillate and 4.0 g. of brown solid residue.

The initial red oil and the liquid distillate showed identical infrared spectra and were identified as mixtures of monomeric N-cyano(trifluoromethyl)azepines on the basis of the following analytical data:

Analysis for $C_8H_5F_3N_2$—Calc'd: C, 51.6; H, 2.71; N, 15.0; mol. wt., 186. Found: C, 51.9; H, 2.77; N, 14.8, 15.0; mol. wt., 186 (mass spec.).

*Infrared spectrum:* Absorption at $3.27\mu$ (=CH); $4.49\mu$ (CN); 5.97, $6.10\mu$ (C=C); $7.59\mu-9.0\mu$ (CF).

*Flourine n.m.r.* (56.4 mc.; "Freon®-112" external reference): Single peak at −53 c.p.s., a doublet at −27 c.p.s., and a single peak at +95 c.p.s. in intensity ratios of 1:2.6:2, respectively.

*Proton n.m.r.:* Three complex absorption areas between $\tau$ 3.2 and $\tau$ 4.5.

*Vapor phase chromatography:* Three components, one of which separated cleanly and two of which could not be completely resolved.

Hydrolysis of 4.3 g. of the monomeric red oil with 12% aqueous hydrochloric acid at 65–70° C. for 1 hour, followed by removal of volatiles in a rotary evaporator, gave a tan-colored acidic liquid mixture which was neutralized with ammonium hydroxide and then diluted with a mixture of absolute alcohol and ether to precipitate ammonium chloride. The supernatant solution was evaporated to dryness and 0.7 g. of a white crystalline product was obtained from the residue by treatment with methylene chloride and petroleum ether. The crystalline product was identified as a trifluoromethyl-substituted phenylurea on the basis of the following analytical data:

*Infrared spectrum:* Absorption at 3.01 and $3.15\mu$ (NH), $6.1\mu$ (C=O), 6.25 and $6.35\mu$ (C=C).

*Flourine n.m.r.* (in dimethyl sulfoxide; "Freon®-112" external reference; 56.4 mc.): Absorption at −425 c.p.s.; suggesting a single compound.

---

[1] Ebullioscopically in ethylene dichloride.

*Proton n.m.r.* (in dimethyl sulfoxide): Complex absorption at τ 1.80 to 3.00 and a single peak at τ 3.50 in an intensity ratio of 5:2, respectively.

The brown residue from the molecular distillation was extracted with acetone to give 7.45μ of white solid having strong infrared absorption at 4.55μ (CN) and 6.01μ, similar to that of N-cyanoazepine dimer. The fluorine n.m.r. spectrum ("Freon®–112," external reference) of this solid showed single peaks at −2234 c.p.s., −138 c.p.s. and −35 c.p.s., and a doublet at +95 c.p.s., all in approximate equal intensities.

*Example 5.—α,α,α-Trichloromethyl-1H-azepine-1-carbonitrile*

A solution of 0.75 g. mole of cyanogen azide in 1330 g. of benzotrichloride was heated at 48–51° C. for 10 hours, during which time approximately 0.56 g. mole of nitrogen was liberated. The reaction mixture yielded a trace of brown solid and 950 ml. of filtrate at room temperature. Concentration of 200 g. of the filtrate in a molecular still produced 30 ml. of a mobile red oil. Infrared analysis of the oil showed the presence of a small amount of residual benzotrichloride together with absorption characteristic of a monomeric N-cyanoazepine [4.50μ (CN) and 6.12μ]. The proton n.m.r. spectrum also showed absorption characteristic of an N-cyanoadepine (region of τ 3.10 to τ 4.70).

An attempt to purify the oil by distillation at temperatures up to 125° C. under 0.4μ pressure resulted in complete dimerization of the monomer. Passage of 200 ml. of the original filtrate through a 3″ column of "Florisil," followed by elution of the column with methylene chloride and concentration of the eluate at 60° C. under 0.1μ pressure, produced a red oil which underwent spontaneous dimerization on standing several hours at room temperature.

*Example 6.—Methoxycarbonyl-1H-azepine-1-carbonitrile*

A solution of 0.37 g. mole of cyanogen azide in 1200 ml. of methyl benzoate was heated at 46–58° C. for 29 hours, during which time approximately 0.36 g. mole of nitrogen was liberated. The reaction mixture yielded 2.55 g. of black solid and 1170 ml. of red filtrate at room temperature. Concentration in a molecular still (55° C./0.1μ pressure) of the methylene chloride eluate obtained by passage of 200 ml. of filtrate through a 2″ bed of "Florisil" produced a mobile red oil which was identified as N-cyanocarbomethoxyazepine by spectral analysis.

*Infrared spectrum*: Absorption at 4.45μ (CN) and 6.15μ (C═C).
*Proton n.m.r.*: Peaks at τ 6.12 and 6.13 (CH$_3$) and complex absorption in the τ 3.30 to 4.41 region.

An attempt to distil the oil resulted in decomposition.

*Example 7.—Bis(trifluoromethyl)-1H-azepine-1-carbonitrile*

A solution of cyanogen azide (0.12 g. mole) in 124 ml. of 1,4-bis(trifluoromethyl)benzene was heated at 49–58° C. for 22 hours, during which time approximately 0.09 g. mole of nitrogen was liberated. Excess solvent was removed on a rotary evaporator at 50° C./1.0 mm.; and the resultant red oil was taken up in methylene chloride and filtered to remove 0.3 g. of solid. The filtrate was evaporated to dryness on a rotary evaporator at 45° C./1 mm. The residue was a red mobile oil (17.65 g.) having an infrared spectrum identical with that of the distilled product described below. Distillation of the oil in a molecular still at 0.02μ pressure and a pot temperature of 35–40° C. gave a liquid red distillate (10.98 g.; $n_D^{25.2}$ 1.4307–1.4320) and a brown crystalline fraction (3.77 g.). The red oil was identified as a mixture of isomeric azepines.

Analysis for $C_9H_4N_2F_6$—Calc'd: C, 42.5; H, 1.59; N, 11.0; Mol. Wt., 254. Found: C, 42.6; H, 1.92; N, 11.2; Mol. Wt., 254 (mass spec.).

*Infrared spectrum*: Absorption at 3.2μ (═CH), 4.44μ (CN), 5.89 and 6.03μ (C═C), and 7.5–9.0μ (CF).
*Fluorine*[19] *n.m.r.* (56.4 mc., 50% in CCl$_4$ "Freon®–112," internal standard): Three main peaks at −25, +16 and +59.6 mc. in a ratio of 1:2.8:1, respectively.
*Proton n.m.r.* (tetramethyl silane internal standard): A complex absorption at τ 2.9–3.4 and two peaks between τ 3.7 and 4.1.

*Example 8.—Hexafluoro-1H-azepine-1-carbonitrile*

A solution of cyanogen azide (0.13 g. mole) in 50 ml. of hexafluorobenzene was heated at 45–50° C. for 14 hours, during which time approximately 0.1 g. mole of nitrogen was liberated. The reaction mixture was filtered to remove a brown solid (2.4 g.) and the filtrate freed of solvent on a rotary evaporator to give 25 g. of light tan crystalline residue. Sublimation of a 3.0 g. portion of the residue gave clear colorless crystals (2.9 g.) melting at 51–52° C., and one recrystallization of the sublimate from petroleum ether gave white needles with the same melting point. The product was identified as hexafluoro-1H-azepine-1-carbonitrile.

Analysis for $C_7F_6N_2$—Calc'd: C, 37.2; H, 50.4; N, 12.4; Mol. Wt., 226. Found: C, 37.4; H, 50.0; N, 12.6, Mol. Wt. 226 (mass spec.).

*Infrared spectrum*: Absorption of 4.47μ (CN) and 5.80μ (FC═CF).
*UV spectrum* (in isooctane): $\lambda_{max}$ at 263 and 209 mμ (ε=2180 and 10,690).
*Fluorine*[19] *n.m.r.* [56.4 mc., fluorotrichloromethane ("Freon®–11") external standard]: Absorption in three equivalent peaks at 5412, 7890, and 8477 cycles per second, respectively.

In the manner of Examples 1–8, solutions of cyanogen azide in excess nitrobenzene and benzonitrile, respectively, were heated at about 50° C. for several hours. The product from nitrobenzene was hydrolyzed in dilute hydrochloric acid, and a mixture of nitrophenylureas was obtained. The product from benzonitrile showed infrared absorption characteristic of the N-cyanoazepine structure. These results are in agreement with predominant formation of the corresponding N-cyanoazepines in reaction of cyanogen azide with nitrobenzene and benzonitrile, respectively.

*Example 9.—Chloro-1H-azepine-1-carbonitrile and chlorophenylcyanamides*

A solution of 0.23 g. mole of cyanogen azide in 60 ml. of methylene chloride was diluted to a volume of 600 ml. with chlorobenzene and heated at 47–55° C. for 9 hours, during which time approximately 0.22 g. mole of nitrogen was liberated. A black solid (2.55 g.) was removed from the reaction mixture by filtration at room temperature, and one-half of the filtrate was concentrated to dryness in a molecular still under 0.1μ pressure at room temperature. The resultant residual tan crystalline solid was extracted with ether, yielding 0.3 g. of insoluble solid and a cherry red solution. Removal of ether from the extract on a rotary evaporator gave 12.5 g. of tan crystalline solid which was dissolved in methylene chloride, passed through a bed of "Florisil," and again concentrated to dryness (12.4 g.).

A 10.4-g. portion of the above "Florisil"-treated solid was mixed with carbon tetrachloride and filtered to yield 1.1 g. of undissolved colorless crystalline solid. Recrystallization of this solid from a mixture of methylene chloride and petroleum ether produced white needles, M.P. 198–200° C., which corresponded by analysis to a dimer of N-cyanochloroazepine.

Analysis for $C_{14}H_{10}N_4Cl_2$—Calc'd: C, 55.1; H, 3.31; N, 18.4; Mol. Wt., 305. Found: C, 55.0; H, 3.35; N, 18.4; Mol. Wt., 290, 304.[1]

*Infrared spectrum*: Absorption at 4.55μ (CN) and 6.05μ.

The filtrate from the mixture with carbon tetrachloride was diluted with petroleum ether, causing separation of 6.5 g. of colorless needles. Recrystallization of this product from cyclohexane produced material, M.P. 98–104° C., which corresponded by analysis to (chlorophenyl)cyanamide.

Analysis for $C_7H_5N_2Cl$—Calc'd: C, 55.1; H, 3.31; N, 18.4. Found: C, 55.4; H, 3.58; N, 18.2.

*Infrared spectrum*: Absorption at 3.2μ (NH), 4.5μ (CN), and 6.3μ (aromatic C=C).

Hydrolysis of a sample of crude concentrated product from another experiment with chlorobenzene and cyanogen azide, by means of 12% aqueous hydrochloric acid at 50–55° C. for 2 hours, gave a derivative in 77% yield which was identified by infrared and proton n.m.r. spectra as a 2:1 mixture of o- and p-chlorophenylureas.

*Example 10.—Methyl-1H-azepine-1-carbonitrile and tolylcyanamides*

A solution of 4.0 g. (0.059 g. mole) of cyanogen azide and 12 ml. of acetonitrile was diluted with 100 ml. of toluene and heated at 55° C. for 2.5 hours during which time approximately 0.02 g. mole of nitrogen was liberated. The reaction mixture was concentrated to a volume of 10 ml. and then mixed with 10 ml. of carbon tetrachloride. On the basis of the proton magnetic resonance of the resultant solution, the product was identified as a mixture of isomeric N-cyanomethylazepines.

*Proton n.m.r.* (tetramethylsilane as internal standard): Two complex groups at τ 3.9 and 4.8, and another group of poorly resolved peaks at τ 7.6–7.9.

On complete removal of the solvent from the above solution at 25° C./0.1μ, the residual product came out as a liquid mixture of tolylcyanamides.

The mixture of tolylcyanamides was prepared without isolation of the intermediate N-cyanomethylazepine by heating a solution of cyanogen azide in excess toluene at 45–58° C. for 6 hours and concentrating the resultant mixture on a rotary evaporator at 80° C./0.5 mm. The residual mobile tan oil was distilled in a molecular still at a bath temperature of 110–150° C. and a pressure of 1.5μ. The partly crystalline distillate was identified as a mixture of o- and p-tolylcyanamides by its infrared spectrum.

*Infrared spectrum*: Strong absorption at 3.1μ (NH), 4.5μ (CN), 6.35μ (aromatic C=C), and 12.4 and 13.4μ (individually characteristic).

Hydrolysis of a sample of crude product, similar to the oily concentrate described above, in 10% aqueous hydrochloric acid produced a 2:1 mixture of o- and p-tolylureas in 97.5% yield. The proportion of o- and p-isomers was determined by proton n.m.r. analysis.

*Example 11.—(t-butylphenyl)cyanamide*

A solution of 0.22 g. mole of cyanogen azide in 130 ml. of t-butylbenzene was diluted with additional t-butylbenzene to a volume of 520 ml. and heated to 44–47° C. for 22.5 hours, during which time approximately 0.19 g. mole of nitrogen was liberated. The mixture was cooled to room temperature and filtered, yielding 510 ml. of filtrate. A 150-ml. portion of the filtrate was passed through a bed of "Florisil," and the bed was eluted with methylene chloride. The eluate was concentrated in a rotary evaporator at 50–60° C./1.5 mm. and 9.8 g. of residual mobile oil was obtained. The product was identified as (t-butylphenyl)cyanamide by spectral analysis.

---

[1] Cryoscopically in dimethyl sulfoxide.

*Infrared spectrum*: Absorption at 3.1μ (NH), 3.39μ (CH), and 4.49μ (CN).

*Proton n.m.r.* (in $CCl_4$ with tetramethylsilane as internal standard): Complex absorption at τ 2.1–3.1 (NH and aromatic protons) and three equivalent single peaks at τ 8.6–8.75. The intensity ratio of the complex absorption to the single peak absorption was 5:9.

A separate sample (170 ml.) of product prepared as described above was added to an equal volume of 50% aqueous sulfuric acid; and the mixture was stirred and heated at 124–127° C. for 2 hours, cooled to room temperature and made basic with aqueous potassium hydroxide. An ether extract of the alkaline mixture was dried and concentrated to yield a mobile liquid residue (5.1 g.). Distillation of the residue in a molecular still at 75° C./0.05μ gave 1.63 g. of colorless distillate, $n_D^{24}$, 1.5393–1.5480, which was identified as a mixture of t-butylanilines by infrared and proton n.m.r. analyses and by vapor phase chromatography.

*Infrared spectrum*: Absorption at 3.0 and 3.1μ (NH), 3.4μ (CH), and 6.2μ (C=C).

*Proton n.m.r.*: Absorption at τ 2.91–3.81 (aromatic protons), two broad peaks at τ 6.64 and 6.86 ($NH_2$), and a sharp peak at τ 8.97 (t-butyl protons). The intensities of absorption in the three rings were in the ratio 4:2:9, respectively.

*Vapor phase chromatography* (1 meter stainless steel column packed with 60–80 mesh firebrick containing 20% butanediol succinate; 160° C.; 80 ml./min. flow): Two prime components at retention times of 11.1 minutes (28.1%) and 16.0 minutes (68.6%).

*Example 12.—Dimethyl-1H-azepine-1-carbonitrile and xylylcyanamide*

A solution of 4 g. (0.059 g. mole) of cyanogen azide in 14 g. of acetonitrile was added to 172 g. of p-xylene and the mixture was heated at 55° C. for 2.5 hours, during which time 0.02 g. mole of nitrogen was liberated. The reaction mixture was filtered and then concentrated at 25° C. under 0.1μ pressure. The product (2.5 g.) was a mobile yellow oil identified as dimethyl-1H-azepine-1-carbonitrile by proton magnetic resonance.

*Proton n.m.r.* (in $CCl_4$ with tetramethylsilane as an internal standard): Complex absorption at τ 4.1–4.8 and two single peaks at τ 8.00 and 8.17 in an intensity ratio of 4:3:3, respectively.

The above product underwent exothermic rearrangement after standing about 30 minutes at room temperature in solution in carbon tetrachloride. The rearrangement product, obtained in essentially quantitative yield, was a white crystalline solid identified as (2,5-dimethylphenyl)cyanamide.

(2,5-dimethylphenyl)cyanamide was prepared without isolation of the intermediate N-cyanodimethylazepine from a solution of cyanogen azide in excess p-xylene heated to 40–43° C. for 55 hours. The reaction mixture yielded directly a brown solid, which was purified by sublimation and two successive recrystallizations from a mixture of carbon tetrachloride and petroleum ether. The pure product, M.P. 117–117.9° C. was identified by analysis as (2,5-dimethylphenyl)cyanamide [recorded M.P. 118° C., Wheeler and Johnson, Am. Chem. Jour., 28, 154 (1902)].

Analysis for $C_9H_{10}N_2$—Calc'd: C, 73.9; H, 6.9 N, 19.2. Found: C, 74.0; H, 7.2; N, 19.5.

*Infrared spectrum*: Absorption at 3.12μ (NH), 3.4 and 3.48μ (saturated CH), 4.48μ (CN), 6.14, 6.31, and 6.58μ (aromatic C=C), and 12.40μ.

*UV spectrum* (in 1,4-dioxane): $\lambda_{max}$ at 285, 278 and 234 mμ (ε=1475, 1475, and 10,424, respectively).

*Proton n.m.r.*: Two single peaks at τ 7.80 and 7.66 (CH₃), complex absorption at τ 3.00 to 3.47 (aromatic protons), and a broad single peak at τ 2.66 (NH).

The single peaks showed intensity ratios of 3:3:1, respectively.

Hydrolysis of a sample of the product in 14% aqueous hydrochloric acid at room temperature produced 2,5-dimethylphenylurea, M.P. 214–215° C. with resolidification at 216° C. and ultimate decomposition above 275° C. [cf., Desai et al., J. Ind. Chem. Soc., 26, 294 (1949)]. The identification of 2,5-dimethylphenylurea was confirmed by the infrared and proton n.m.r. spectra and elemental analysis.

Analysis for $C_9H_{12}N_2O$—Calc'd: C, 65.8; H, 7.37; N, 17.1. Found: C, 66.1; H, 7.55; N, 16.9.

In another experiment, a 93% yield of crude 2,5-dimethylphenylcyanamide was obtained by reaction of cyanogen azide and p-xylene at 40–52° C. for 17 hours.

Example 13.—Methoxyphenylcyanamide

A solution of 0.23 g. mole of cyanogen azide in 100 ml. of anisole was heated at 46–52° C. for 12 hours, during which time 0.13 g. mole of nitrogen was liberated. The reaction mixture gave a positive test for unchanged cyanogen azide. Filtration at room temperature gave 3 g. of a tan solid and a filtrate which was diluted with 500 ml. of ether. The dilution with ether caused precipitation of 9 g. of yellow solid, which was separated by filtration. The ether-containing filtrate was concentrated on a rotary evaporator under 1 mm. pressure and 60–75° C. to produce 15.9 g. of a straw-colored oil, from a small sample of which was obtained a crop of colorless crystals by sublimation. The sublimed solid was recrystallized from a mixture of carbon tetrachloride and petroleum ether to yield a product, M.P. 75.8–77.4° C., which was identified as (methoxyphenyl)-cyanamide (probably a mixture of isomers).

Analysis for $C_8H_8N_2O$—Calc'd: C, 64.6; H, 5.42; N, 18.8. Found: C, 64.4; H, 5.26; N, 19.0.

*Infrared spectrum:* Absorption at 3.13μ (NH), 3.31 (≡CH), and 3.4 and 3.51μ (satd. CH), 6.2 and 6.59μ (aromatic C=C).

*Proton n.m.r.* (solution in DCCl₃, tetramethylsilane internal standard): A complex pattern at τ 2.50 to 3.15 and a single peak at τ 6.09 in an intensity ratio of 5:3, respectively.

Variously substituted N-cyanoazepines and aromatic cyanamides can be prepared by procedures illustrated in the foregoing examples. The following reaction scheme, previously defined,

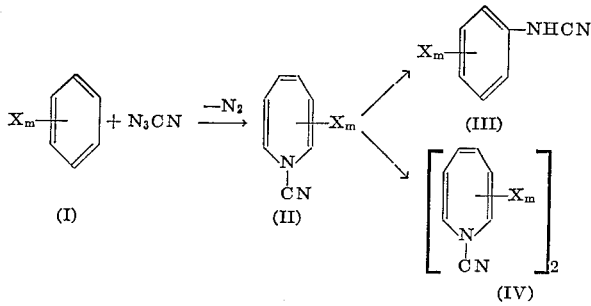

depicts the aromatic compound (I) from which monomeric N-cyanoazepines (II) and dimeric N-cyanoazepines (IV), and aromatic cyanamides (III) are obtained by reaction with cyanogen azide. Included among the X substituents are groups which may be further defined as being R, R', RO and

groups, respectively. The R groups above include saturated alkyl groups of 1 to 18 carbons, preferably lower alkyl groups of 1 to about 8 carbons. The R' groups preferably include lower haloalkyl groups of 1 to about 8 carbons containing one or more halogen atoms (F, Cl, Br, or I), including perfluoro and perchloro groups. Representative aromatic compounds of Formula I from which are obtained corresponding products of Formulas II, III and IV are given in Table A, which lists the X substituents in columns arranged so that each horizontal line defines a specific aromatic reactant. Corresponding values of m are shown in a separate column, and the numbers at the head of the individual columns under "X substituents" indicate the positions on the benzene ring at which the substituents are attached.

As illustrated in Example 1–C, the reaction of cyanogen azide with an aromatic compound (cf., Table A) can be carried out in a solvent. The use of a solvent is particularly advantageous when the aromatic reactant is normally a solid. Solvents which are relatively less reactive than aromatic compounds with cyanogen azide in the temperature range of 35–150° C. are especially useful. Such solvents include alkyl esters and nitriles of alkanoic acids, e.g., ethyl acetate and acetonitrile; saturated hydrocarbons, e.g., hexanes, octanes, etc.; halogenated saturated hydrocarbons, e.g., methylene chloride, ethylene dibromide, dichlorotetrafluoroethane, etc.; nitro derivatives of saturated hydrocarbons, e.g., nitromethane, nitrocyclohexane, etc.; N,N-dialkylamides, e.g., dimethylformamide, N,N-diethylacetamide, etc.; and cyanogen halides, e.g., cyanogen chloride and cyanogen bromide.

The N-cyanoazepines of this invention are useful as inhibitors to prevent free radical-initiated polymerization of vinyl monomers. For example, addition of 0.12 to 0.2% of monomeric N-cyanoazepine (Example 1) based on the amount of vinyl monomer to samples of acrylonitrile, methyl methacrylate, and styrene, each containing 0.1% by weight of α,α'-azodiisobutyronitrile initiator and heated at temperatures in the range of about 65–80° C., had the effect of completely preventing the formation of solid polymers. Similarly, 5 g. of freshly distilled methyl methacrylate containing 0.01 g. of dimeric N-cyanoazepine (Example 2) and 0.005 g. of α,α'-azodiisobutyronitrile did not form a solid polymer when heated at 71–75° C. for 5 hours. In contrast, control samples of these monomers containing the initiator but no N-cyanoazepine yielded solid polymers under the same conditions. The aromatic cyanamide products are useful as intermediates to corresponding ureas, which are obtained by hydrolysis of the cyanamides.

Since obvious modifications and equivalents in the invention will be evident to those skilled in the chemical arts, I propose to be bound solely by the appended claims.

TABLE A.—X SUBSTITUENTS

| m | 1 | 2 | 3 | 4 | 5 | 6 |
|---|---|---|---|---|---|---|
| 1 | Phenyl | | | | | |
| 1 | Iodo | | | | | |
| 1 | Ethyl | | | | | |
| 1 | n-Amyl | | | | | |
| 1 | n-Decyl | | | | | |
| 1 | n-Octadecyl | | | | | |
| 1 | iso-Propyl | | | | | |
| 1 | Cyclohexyl | | | | | |
| 1 | Fluoromethyl | | | | | |
| 1 | 2-bromoethyl | | | | | |
| 1 | n-Hexyloxy | | | | | |

TABLE A.—Continued

| m | 1 | 2 | 3 | 4 | 5 | 6 |
|---|---|---|---|---|---|---|
| 1 | n-Dodecyloxy | | | | | |
| 1 | n-Amyloxycarbonyl | | | | | |
| 1 | n-Hexadecyloxycarbonyl | | | | | |
| 2 | Fluoro | | | Bromo | | |
| 2 | do | | | Methyl | | |
| 2 | Methyl | | Methyl | | | |
| 2 | Ethyl | | | Ethyl | | |
| 2 | n-Propyl | n-Amyl | | | | |
| 2 | Methyl | | n-Hexadecyl | | | |
| 2 | Chloromethyl | | | Chloromethyl | | |
| 2 | Fluoro | | | Ethoxy | | |
| 2 | Ethoxy | | Ethoxy | | | |
| 2 | Methyl | | n-Octyloxy | | | |
| 2 | Fluoro | | Methoxycarbonyl | | | |
| 2 | Bromo | | | Methoxycarbonyl | | |
| 2 | Methyl | Methoxycarbonyl | | | | |
| 2 | Ethoxycarbonyl | | | Ethoxycarbonyl | | |
| 2 | Iodo | | | Cyano | | |
| 2 | Methyl | Cyano | | | | |
| 2 | Cyano | | Cyano | | | |
| 2 | do | Ethoxy | | | | |
| 2 | do | | n-Propoxycarbonyl | | | |
| 2 | Chloro | | | Nitro | | |
| 2 | Methyl | Nitro | | | | |
| 2 | Cyano | do | | | | |
| 2 | Nitro | | | iso-Butoxy | | |
| 2 | do | | n-Amyloxycarbonyl | | | |
| 2 | 1,3-butadienylene | 1,3-butadienylene | | | | |
| 3 | Chloro | | Chloro | | Chloro | |
| 3 | Bromo | Methyl | | | Methyl | |
| 3 | Methyl | do | | Methyl | | |
| 3 | Ethyl | | Ethyl | | Ethyl | |
| 3 | Methyl | | Methyl | n-Hexyl | | |
| 3 | Chloro | | Chloro | | Methoxy | |
| 3 | Methyl | | Methoxy | Chloro | | |
| 3 | Methoxy | Methoxy | do | | | |
| 3 | Bromo | Methoxycarbonyl | | Methoxycarbonyl | | |
| 3 | Chloro | do | | Chloro | | |
| 3 | Methyl | do | | | Methoxycarbonyl | |
| 3 | Methoxycarbonyl | do | Methoxycarbonyl | | | |
| 3 | do | n-Propoxy | | Bromo | | |
| 3 | Cyano | Chloro | | Bromo | | |
| 3 | do | Cyano | | Cyano | | |
| 3 | Ethoxycarbonyl | Nitro | Bromo | Nitro | | |
| 3 | Cyano | Bromo | | Chloro | | |
| 3 | Ethoxy | Nitro | | Nitro | | |
| 3 | Methyl | Methyl | | Methoxy | | |
| 3 | do | Chloro | | Nitro | | |
| 3 | Nitro | Nitro | | Bromo | | |
| 3 | Ethoxy | Methoxycarbonyl | Nitro | | | Ethoxycarbonyl. |
| 3 | Methoxycarbonyl | Methoxy | | | | Nitro. |
| 3 | Cyano | Nitro | Nitro | Nitro | | |
| 3 | Fluoro | | do | do | | |
| 3 | Methoxy | | | do | | |
| 3 | Ethoxycarbonyl | | | do | | |
| 3 | Cyano | Nitro | | | | |
| 4 | Methyl | Methyl | Methyl | Methyl | | |
| 4 | do | Chloro | do | Chloro | | |
| 4 | Chloro | do | Chloro | do | Chloro | Chloro. |
| 4 | Nitro | do | do | do | | Do. |
| 4 | Ethoxy | do | do | Chloro | Chloro | |
| 4 | Ethoxycarbonyl | do | do | do | | Do. |
| 4 | Cyano | Chloro | | | | |
| 5 | Methyl | Methyl | Methyl | Methyl | Methyl | Do. |
| 5 | do | do | Chloro | Chloro | Chloro | |
| 5 | Chloro | Chloro | do | do | do | Do. |
| 5 | Nitro | do | do | do | | Do. |
| 5 | Methoxy | do | do | Chloro | Chloro | |
| 5 | Ethoxycarbonyl | do | do | do | do | Do. |
| 5 | Cyano | do | do | | | |
| 6 | Methyl | Methyl | Methyl | Methyl | Methyl | Methyl. |
| 6 | do | Chloro | do | do | Chloro | Chloro. |
| 6 | Chloro | do | do | Chloro | do | Do. |
| 6 | Nitro | do | do | do | do | Do. |
| 6 | n-Butoxy | do | do | do | do | Do. |
| 6 | Methoxycarbonyl | do | do | do | do | Do. |
| 6 | Cyano | do | do | do | do | Do. |

The embodiments of the invention in which an exclusive property or privilege is claimed are defined as follows:

1. The process which comprises reacting cyanogen azide with a benzenoid compound free of nonaromatic unsaturation at a temperature in the range 35–150° C.
2. The process of claim 1 carried out in an organic diluent.
3. The process of claim 1 in which the benzenoid compound is benzene.
4. The process of claim 1 in which the benzenoid compound is fluorobenzene.
5. The process of claim 1 in which the benzenoid compound is benzotrifluoride.
6. The process of claim 1 in which the benzenoid compound is benzotrichloride.
7. The process of claim 1 in which the benzenoid compound is methyl benzoate.
8. The process of claim 1 in which the benzenoid compound is 1,4-bis(trifluoromethyl)benzene.
9. The process of claim 1 in which the benzenoid compound is biphenyl.
10. The process of claim 1 in which the benzenoid compound is naphthalene.

11. A compound of the formula

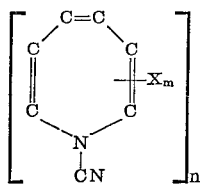

wherein:
X is at least one member of the group consisting of monovalent halogen, cyano, nitro, phenyl, alkyl of 1–18 carbons, cyclohexyl, haloalkyl of 1–8 carbons, alkoxy of 1–18 carbons and alkoxycarbonyl of 2–19 carbons and divalent 1,3-butadienylene;
m is a cardinal number in the range 0–6 with the proviso that it is not greater than 2 when X is butadienylene;
n is a cardinal number in the range 1–2; and
the sum of the valence bonds on the depicted ring filled by X and hydrogen is 6.

12. 1H-azepine-1-carbonitrile.
13. 1H-azepine-1-carbonitrile dimer.
14. Fluoro-1H-azepine-1-carbonitrile.
15. α,α,α-Trifluoromethyl-1H-azepine-1-carbonitrile.
16. Methoxycarbonyl-1H-azepine-1-carbonitrile.
17. Bis(trifluoromethyl)-1H-azepine-1-carbonitrile.
18. Hexafluoro-1H-azepine-1-carbonitrile.
19. Chloro-1H-azepine-1-carbonitrile.
20. Methyl-1H-azepine-1-carbonitrile.
21. Dimethyl-1H-azepine-carbonitrile.

References Cited by the Examiner

Cotter, J. Org. Chem., vol. 29, pages 751–754 (1964).
Gould, Mechanism and Structure in Organic Chemistry (New York, 1959), pages 283–4, 429 and 434.
Hafner et al., Angewandte Chemie, International Edition in English, vol. 2, page 96 (1963).
Lwowski et al., J. Am. Chem. Soc., vol. 85, pages 1200–1202 (1963).

HENRY R. JILES, *Primary Examiner.*
ALTON D. ROLLINS, *Assistant Examiner.*